United States Patent
Person et al.

(10) Patent No.: US 10,354,775 B2
(45) Date of Patent: *Jul. 16, 2019

(54) REDUCTION OF DIELECTRIC LOSSES THROUGH USE OF ORGANOCLAY IN SEMICONDUCTOR OR INSULATOR COMPOSITIONS

(71) Applicant: Union Carbide Chemicals & Plastics Technology LLC, Midland, MI (US)

(72) Inventors: Timothy J. Person, Freehold, NJ (US); Robert F. Eaton, Belle Mead, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,683

(22) Filed: Mar. 23, 2018

(65) Prior Publication Data

US 2018/0211742 A1   Jul. 26, 2018

Related U.S. Application Data

(63) Continuation of application No. 12/741,116, filed as application No. PCT/US2008/079915 on Oct. 15, 2008, now Pat. No. 9,959,951.

(60) Provisional application No. 60/984,813, filed on Nov. 2, 2007.

(51) Int. Cl.
| | |
|---|---|
| C08K 5/17 | (2006.01) |
| H01B 3/00 | (2006.01) |
| C08K 9/04 | (2006.01) |
| H01B 1/22 | (2006.01) |
| H01B 3/44 | (2006.01) |

(52) U.S. Cl.
CPC .............. *H01B 3/004* (2013.01); *C08K 9/04* (2013.01); *H01B 1/22* (2013.01); *H01B 3/441* (2013.01)

(58) Field of Classification Search
None
See application file for complete search history.

(56) References Cited

U.S. PATENT DOCUMENTS

| | | |
|---|---|---|
| 5,780,376 A | 7/1998 | Gonzales et al. |
| 6,156,835 A | 12/2000 | Anderson et al. |
| 6,524,702 B1 | 2/2003 | Betso et al. |
| 2003/0008158 A1 | 1/2003 | Carrus et al. |
| 2004/0147700 A1 | 7/2004 | Ortiz et al. |
| 2005/0133248 A1 | 6/2005 | Easter |

(Continued)

FOREIGN PATENT DOCUMENTS

| | | |
|---|---|---|
| EP | 1033724 A1 | 9/2000 |
| JP | 2003/022710 A | 1/2003 |
| WO | 0192388 A1 | 12/2001 |

(Continued)

OTHER PUBLICATIONS

Product brochure of Cloisite 25A (2012).

(Continued)

*Primary Examiner* — Samir Shah
(74) *Attorney, Agent, or Firm* — Husch Blackwell LLP

(57) ABSTRACT

Organoclays are added to semiconductive compositions to provide a reduction in the dielectric losses of layered composites in which the semiconductive layer contains species which could migrate into the insulation and result in undesirably high dielectric losses. The invention semiconductive compositions provide improved performance in power cable applications.

13 Claims, 3 Drawing Sheets

DF of insulation layers

(56) References Cited

U.S. PATENT DOCUMENTS

2007/0012468 A1   1/2007   Han et al.

FOREIGN PATENT DOCUMENTS

WO   2004/009694 A1   1/2004
WO   2005/017014 A1   2/2005

OTHER PUBLICATIONS

Product bulletin of Cloisite 30B, date unknown.
Grounds of Opposition filed against EP 2215158 dated Oct. 18, 2012.
S. Flaridoss, et al., Conference Record of the 1992 IEEE International Symposium on Electrical Insulation, Baltimore, MD USA, Jun. 7-10, 1992, pp. 120-124.
Excerpt from glossary available on http://www.nanocor.com/glossary_com.asp, printed Oct. 13, 2012.
Technical Data sheet G-100 about General Information About Nanomer Nanoclays obtained from http:/www.nanocor.com/tech_sheets2.asp, Dec. 2004.
H. Pluta et al., European Polymer Journal 43, 2007, pp. 2819-2835.

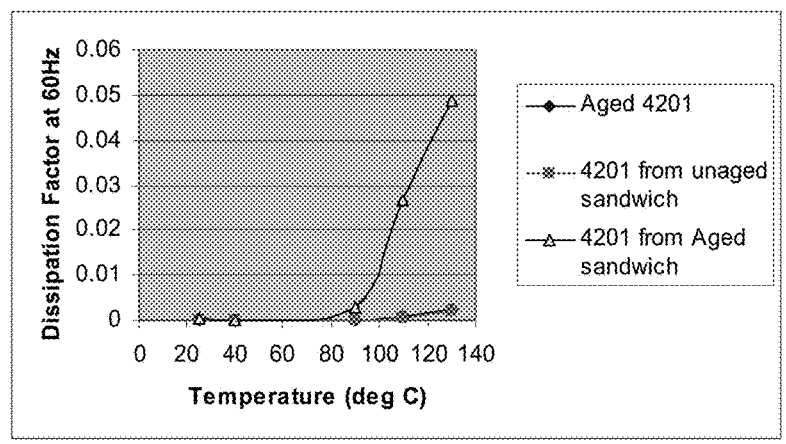
FIG 1: DF of insulation layers
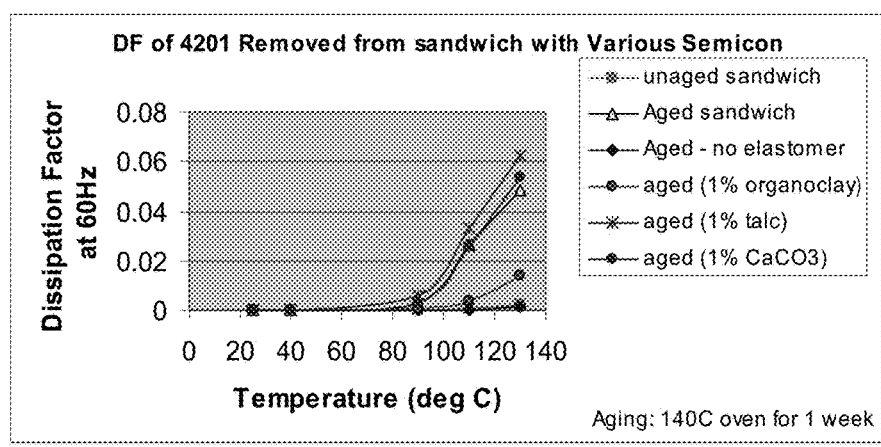
FIG 2: DF of 4201 removed from a sandwich with various semiconductive compositions.

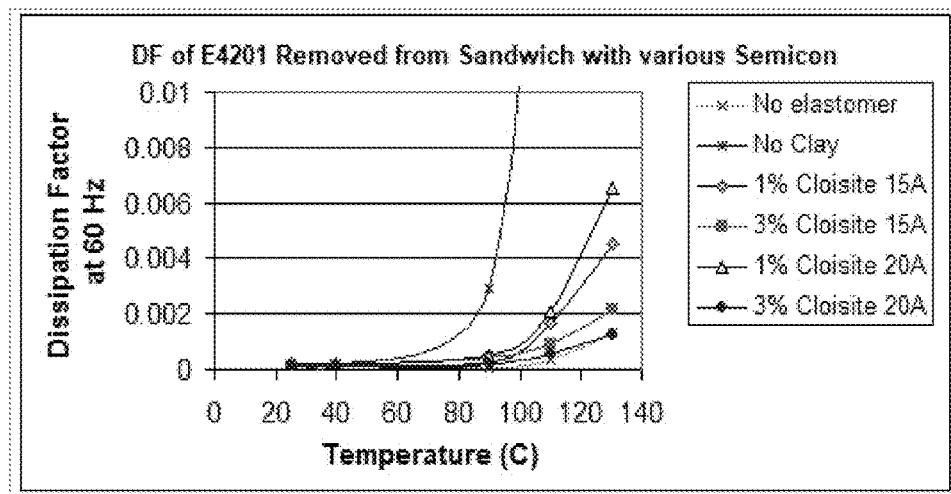
FIG 3: Dissipation Factor of E4201 after aging in contact with Semiconductors of various compositions.
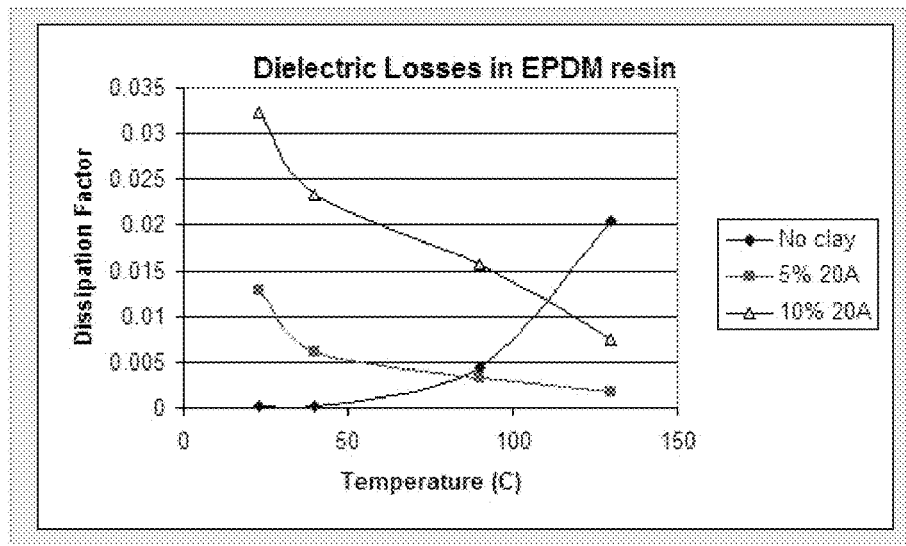
FIG 4: Graphical representation of dissipation factor data of Table 4.

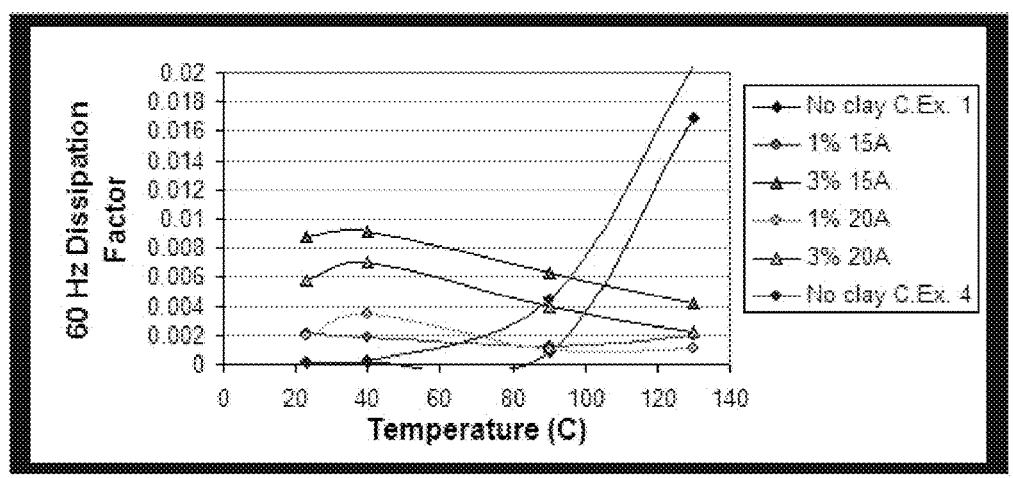
FIG 5: Graphical representation of dissipation factor data in Table 5. Comparative Examples 1 and Comparative Example 4 represent the same composition from separate preparations.

REDUCTION OF DIELECTRIC LOSSES THROUGH USE OF ORGANOCLAY IN SEMICONDUCTOR OR INSULATOR COMPOSITIONS

FIELD OF THE INVENTION

The present invention relates generally to reducing dielectric losses and more specifically to formulation of semiconductor or insulator compositions for improved performance in power cable applications and the like.

BACKGROUND OF THE INVENTION

Typical power cables, including those for small appliances to outdoor station-to-station power cables, often comprise one or more conductors in a core that may be surrounded by one or more layers. These layers may include one or more of the following: a first polymeric semi-conducting shield layer; a polymeric insulating layer; a second polymeric semi-conducting shield layer; and optionally, a metallic tape shield; and a polymeric jacket.

Semiconductive compositions may include resin components which are known to exhibit high dielectric losses when used in insulating compositions. While this may not be a problem in a semiconductive composition, species migration from the semiconductive layer into an adjacent insulation layer can lead to increased dielectric losses of the layered composite. Reduction in the migration of the diffusing species from the semiconductive layer into the insulation, or enhanced solubilization of this species within the semiconductive layer is expected to yield improved dielectric properties of the layered composite. This would be useful in electrical applications such as power cables.

Some elastomeric components used in semiconductive shield formulations may contain species that diffuse into the insulation, which leads to enhanced dielectric losses in power cables (especially at temperatures above the 90° C. normal operating temperature rating of the cable).

The present invention provides a means to enable the use of a class of elastomeric materials in the semiconductive compositions of the cable design that would otherwise lead to much higher cable dielectric losses in shorter aging times.

BRIEF SUMMARY OF THE INVENTION

The present invention relates to the use of particular organoclays in a semiconductive layer and/or an insulator layer to provide reduced dielectric losses. Improved dielectric performance has been demonstrated by addition of a small amount of organoclay in the semiconductive composition or in the insulator. The increase in dielectric losses of the insulation adjacent to the semiconductive layer containing organoclay was reduced significantly after a similar period of thermal aging.

In one embodiment, the invention is a structure comprising a semiconducting layer comprising a first material that comprises a first polymeric resin and a conductive filler and an insulating layer comprising a second material that comprises a second polymeric resin, wherein the semiconducting layer and the insulating layer are at least partially in physical contact with each other, wherein at least one of the first material and the second material comprise an organoclay and wherein the first polymeric resin and the second polymeric resin may be the same or different.

In another embodiment the invention is an article comprising an insulating layer that comprises a composition comprising at least one polymeric resin and at least one organoclay.

In one embodiment the invention is a cable comprising a core comprising one or more conductors; a semiconducting layer comprising a first material that comprises a first polymeric resin and a conductive filler and, an insulating layer adjacent to the semiconductor layer, the insulating layer comprising a second material that comprises a second polymeric resin, wherein the semiconducting layer and the insulating layer directly or indirectly surround the core, wherein at least one of the first material and the second material comprise an organoclay and wherein the first polymeric resin and the second polymeric resin may be the same or different.

In one embodiment the ratio of AC dielectric losses of a comparative structure (that is identical to the structure except that the comparative structure lacks Organoclay), to the structure is greater than 1.5.

In one embodiment the invention is an article comprising an insulating layer that comprises a composition comprising at least one polymeric resin and at least one Organoclay, wherein the polymeric resin has an AC dielectric loss at least 1.5 times greater than the AC dielectric loss of the layer.

In one embodiment the invention is an insulator comprising a polymeric resin and an organoclay, wherein the ratio of AC dielectric loss of the polymeric resin to the AC dielectric loss of the insulator is at least 1.5

BRIEF DESCRIPTION OF THE FIGURES

FIG. 1 is a graph showing dissipation factors of insulation layers.

FIG. 2 is a graph showing dissipation factors of insulators removed from contact with various semiconductive compositions.

FIG. 3 is a graph showing dissipation factors after aging in contact with semiconductors of various compositions.

FIG. 4 is a graphical representation dissipation factors in EPDM resins.

FIG. 5 is a graph showing dissipations factors of various compositions.

DETAILED DESCRIPTION OF THE INVENTION

The present invention enables the use of a class of elastomeric materials in the semiconductive compositions of the cable design that would otherwise lead to much higher cable dielectric losses in shorter aging times. Organoclays have been used in the preparation of semiconductive compositions or in insulation compounds to reduce the migration of species from the semiconductive composition into adjacent insulating layers, where they would otherwise contribute to significant increases in dielectric losses of the layered composite. The result is a reduction in the dielectric losses of layered composites in which the semiconductive layer contains species which could migrate into the insulation and result in undesirably high dielectric losses. Similarly, the use of organoclays may also be advantageous in insulations that may not need adjacent semiconductive layers. In this case, the lossy dielectric species may be inherent within the insulation and the use of organoclay helps to mitigate the lossy nature of the insulation.

The term "insulator" or "insulation" as used herein means any material that resists, or prevents, the flow of electricity through the material. The insulators of the current invention normally comprise polymeric resins or compounds, as described below. Such polymeric resins typically have inherent insulating properties.

The term "semiconductor" or "semiconductive" as used herein means any material or property respectively that is intermediate in electrical conductivity between conductors and insulators, through which conduction takes place by means of holes and electrons. The semiconductors of the current invention normally are compositions of polymeric materials with a conductive filler, as described below.

A wide variety of polymeric materials have been utilized as electrical insulating and semi-conducting shield materials for power cables and in other numerous applications. In order to be utilized in services or products where long term performance is desired or required, such polymeric materials, in addition to having suitable dielectric properties, must also be enduring and must substantially retain their initial properties for effective and safe performance over many years of service. For example, polymeric insulation utilized in building wire, electrical motor or machinery power wires, underground power transmitting cables, fiber optic telecommunication cables, and even small electrical appliances must be enduring not only for safety, but also out of economic necessity and practicality. Non-enduring polymeric insulation on building electrical wire or underground transmission cables may result in having to replace such wire or cable frequently.

Common polymeric compositions for use in electrical devices are made from polyvinylchloride (PVC), polyethylene homopolymers and copolymers, ethylene/vinyl acetate (EVA) copolymer or ethylene-propylene elastomers, otherwise known as ethylene-propylene-rubber (EPR). Each of these polymeric compositions is often undesirable for one or more reasons. For instance, the use and disposal of PVC is often heavily regulated for environmental reasons and a suitable substitute material for use in electrical insulation would be desirable.

Polyethylene is generally used neat without a filler as an electrical insulation material. There have been attempts in the prior art to make polyethylene-based polymers with long term electrical stability. For example, polyethylene has been crosslinked with dicumyl peroxide in order to combine the improved physical performance at high temperature and have the peroxide residue function as an inhibitor of the propagation of electrical charge through the polymer, a process known as tree formation. Unfortunately, these residues are often degraded at most temperatures they would be subjected to in electrical power cable service.

In contrast to polyethylene, EPR is generally used as an electrical insulator in combination with a high level of filler (typically about 20 to 50 percent by weight). Unfortunately, this combination of EPR and filler usually gives poor dielectric properties.

The semi-conductive compositions of the devices of the present invention typically comprise a polymer or polymer blend and a conducting filler to render the composition semi-conducting. The most common fillers for semi-conductive compositions are carbon black and graphite. The amount of filler will vary depending on the type of filler and other components. Generally, the filler will comprise from about 10 to about 55 weight percent of the filled semi-conductive composition. Preferably, the filler will comprise from about 20 to about 45, more preferably from about 30 to about 40, weight percent of the filled semi-conductive composition. If desired, a plurality of neutral wires which are usually made of copper may be embedded in or wrapped around the layer of semi-conducting insulation shielding in the form of a concentric helices around the insulated cable.

As used herein, an organoclay (also known as organophilic clay) is generally an organopolysilicate. Organoclays are made by reacting, via ion exchange mechanisms, organocations with natural clays. The organocations exchange with the natural interlayer cations of the clay to generate organophilic surfaces while maintaining a lamellar structure similar to the natural clay. Typically, the organocations are quaternary ammonium compounds. Common examples of organoclays include clays, such as kaolin or montmorillonite, to which organic structures have been chemically bonded. Organoclays used in the invention may have an excess of quaternary ammonium compounds. More details of producing organoclays can be found in e.g. U.S. Pat. No. 5,780,376. Organoclays are also commercially available, such as the CLOISITE® line of natural montmorillonite clays modified with quaternary ammonium salts available from Southern Clay Products, Inc. The organoclay is typically added at a level of up to about 3 wt % based on the total weight of the polymeric resins in the compound. In some embodiments, the amount of organoclay ranges from about 1 wt % to about 3 wt %, based on the total weight of the resins in the compound.

The organoclay can be incorporated into the insulator or semiconductor compositions by any method that provides adequate distribution and mixing. Typically, the organoclay is melt mixed with the resins in a melt mixer, extruder or similar equipment. Techniques for melt blending of a polymer with additives of all types are known in the art and can typically be used in the practice of this invention. Typically, in a melt blending operation useful in the practice of the present invention, the polymer resin is heated to a temperature sufficient to form a polymer melt and combined with the desired amount of the organoclay in a suitable mixer, such as an extruder, a Banbury Mixer, a Brabender mixer, or a continuous mixer. The composite may be prepared by shearing the polymer and the organoclay in the melt at a temperature equal to or greater than the melting point of the polymer. Mechanical shearing methods are employed such as by extruders, injection molding machines, Banbury type mixers, or Brabender type mixers. Shearing may be achieved by introducing the polymer melt at one end of an extruder (single or double screw) and receiving the sheared polymer at the other end of the extruder. The temperature of the melt, residence time of the melt in the extruder and the design of the extruder (single screw, twin screw, number of flights per unit length, channel depth, flight clearance, mixing zone) are several variables which control the amount of shear to be applied.

Alternatively, the polymer may be granulated and dry-mixed with the organoclay and thereafter, the composition heated in a mixer until the polymer resin is melted to form a flowable mixture. This flowable mixture can then be subjected to a shear in a mixer sufficient to form the desired composite. The polymer may also be heated in the mixer to form a flowable mixture prior to the addition of the organoclay. The organoclay and polymer resin are then subjected to a shear sufficient to form the desired composite.

The current invention is useful in preventing long-term dielectric losses in structures having a semiconductor layer adjacent to an insulating layer, in particular wires and cables.

EXAMPLES

A laboratory method has been developed to thermally age (1 week at 140° C.) a "sandwich" prepared from one layer of insulation and another of the semiconductive composition, and then to separate the layers for dielectric analysis of the insulating layer only. Differences in the dielectric losses of the insulation layer can thereby be attributed to differences in the semiconductive formulation against which the insulation layer was in contact during the aging process. The losses are also compared to insulation layers that are thermally aged with no exposure to semiconductor layers, insulation layers removed from semiconductor compositions without aging, and insulation layers removed from semiconductors after aging in which the semiconductor composition contained no elastomer. Two different insulation formulations are employed to demonstrate that the observed increase in dielectric losses is not related to the tree-retardant insulation formulation or specific interactions of that formulation with elements of the semiconductive compositions. The test formulations are shown in Table 1 and the test results are shown in Tables 2A and 2B, and FIGS. 1 and 2.

| | Procedure |
|---|---|
| 1 | Mold a 50-mil semiconductor plaque and cure at 180° C. under pressure for 16 minutes. |
| 2 | Mold a 30-mil insulation plaque and cure at 180° C. under pressure for 16 minutes. |
| 3 | Prepare a semiconductor-insulation layered plaque in press at 180° C. under low pressure. Leave at temperature for 5 minutes, just to allow time for intimate contact. |
| 4 | Condition layered plaque in a vacuum oven at 60° C. for 1 week. |
| 5 | Aged sandwich in oven at 140° C. for 1 week. |
| 6 | Separate layers and measure the insulation plaque thickness. |
| 7 | At 60 Hz and 2 kV, measure the dielectric constant and dissipation factor of the insulation at room temperature, 40, 90, 110, and 130° C. |

Comparative Examples 1-12 and Example 13

Comparative Example 1 represents a baseline characterization of the insulation dielectric properties after 1 week of aging at 140° C. The insulation from Comparative Example 1 has not contacted a semiconductive composition. The 60 Hz dissipation factor does not change significantly between room temperature and 90° C., and is approximately 1e-4. As temperatures increase above the melting point of the low density polyethylene insulation, the dissipation factor increases, and an increase of about 1 order of magnitude is observed at 130° C. as compared to the room temperature measurement.

In Comparative Example 2, the insulation is molded against a semiconductor formulation. The layers are separated before any thermal aging. The resulting dielectric properties of the insulation are similar to Comparative Example 1. In Comparative Example 3, the insulation-semiconductor composite is aged prior to separation of the layers. The dielectric properties of the insulation are not substantially altered at room temperature, but significantly higher losses are experienced at higher temperatures. At temperatures of 90° C. and higher, the insulation from Comparative Example 3 exhibits a dissipation factor that is approximately 20 times higher than the unaged insulation of Comparative Example 2 or the insulation without contact to semiconductor of Comparative Example 1. The results clearly indicate that the method sufficiently reproduces the mechanism that led to the experience of high dielectric losses after thermal aging in a cable construction using the elastomer-containing semiconductor of composition SC-1. The results also indicate that the mechanism that leads to the increased dielectric losses is related to the diffusion of a lossy species from the semiconductive material into the insulation layer.

In Comparative Examples 4 through 8, the HFDB-4202 tree-retardant insulation formulation is employed. This is the same insulation as was used in the cable that exhibited high dielectric losses after thermal aging.

Comparative Example 8 shows the dielectric losses after thermal aging of the insulation without contact with a semiconductive composition. The dissipation factor as a function of temperature is similar to that exhibited by the HFDE-4201 insulation of Comparative Example 1, with values in the range of 2e-4 to 3e-4 at 130° C.

For Comparative Examples 4 and 6, the dissipation factor of the insulation which was molded against semiconductive compositions containing different elastomer content was measured prior to any thermal aging. The resulting dissipation values are similar to the unaged insulation of Comparative Example 8.

In Comparative Examples 5 and 7, the insulation semiconductor sandwich was thermally aged prior to the measurement of the dielectric properties of the insulation layer. As was observed in similar experimentation with HFDE-4201 in Comparative Example 3, the dissipation factor values increase dramatically at temperatures of 90° C. and above for the insulation of Comparative Examples 5 and 7, in which HFDB-4202 insulation was aged in contact with the semiconductive compositions containing elastomer. The dissipation factors experienced at 130° C. were so high that there was difficulty making the dissipation factor measurement (therefore the value is reported as "NO READING"). It can be seen, however, that the dissipation factor values at 110° C. were approximately 100 times that of Comparative Example 8, in which the same insulation was thermally aged without contact with the semiconductive compositions.

A comparison of Comparative Example 5 to Comparative Example 7 indicates that the difference in the level of elastomer used in SC-2 and SC-3 was not significant enough to make a notable difference in the high-temperature dissipation factor.

The results of Comparative Examples 4 through 8 confirm that the test method is suitable to probe the effects of the mechanism that leads to increased dielectric losses in thermally aged cables, and that the mechanism is related to diffusion of a lossy species from the semiconductive composition into the insulation layer.

Comparative Example 9 employs HFDE-4201 which is thermally aged against a semiconductive composition SC-4. However, SC-4 has been formulated without the presence of the propylene-ethylene elastomer. The results of the dielectric measurements on the insulation are similar to that of Comparative Example 1, which is the aged insulation that never contacted a semiconductive composition.

This clearly demonstrates that the elastomer is the source of the species which diffuses into the insulation to yield high dielectric losses.

Comparative Examples 10 through 12 and Example 13 examine the use of various fillers in the semiconductive composition in an effort to affect the resulting dielectric performance of an insulation when thermally aged against the semiconductive composition. Comparative Examples 10 and 11 utilize semiconductive compositions SC-5 and SC-6, which contain calcium carbonate or talc. These mineral fillers have the potential to reduce diffusion rates of migrating species, and can neutralize acidic species that could negatively impact dielectric performance. The resulting dielectric performance of the insulation in Comparative Examples 10 and 11, however, was not improved relative to the high-losses experienced from the insulation in Comparative Example 3.

Comparative Example 12 employs semiconductive composition SC-7, in which natural montmorillonite clay was incorporated. Such clays have been used to improve barrier properties (reduce diffusion). However, the resulting dielectric properties from the insulation in Comparative Example 12 are not improved relative to the high losses experienced in Comparative Example 3.

The present invention is exemplified in Example 13, in which the semiconductive composition SC-8 contains an organoclay treated with an excess of quaternary ammonium.

The dissipation factor of the insulation after thermal aging against SC-8 is substantially improved (lower) at temperatures of 90° C. and higher, relative to that of Comparative Example 3, in which the semiconductor composition SC-1 contained no organoclay. The use of the organoclay in the formulation of SC-8 is not sufficient to result in dissipation factor performance of the aged insulation without contact to semiconductors, which indicates that migration of the lossy species from the semiconductive formulation has been reduced but not completely prevented. However, it is significant that the use of fillers at the same loading level was not effective in retarding diffusion of the lossy species.

It should be noted that exfoliation of the organoclay in the composition is not expected.

TABLE 1

| Compositions for Examples and Comparative Examples | | | | | | | | | |
|---|---|---|---|---|---|---|---|---|---|
| Component | SC-1 | SC-2 | SC-3 | SC-4 | SC-5 | SC-6 | SC-7 | SC-8 | SC-9 |
| EVA | 43.6 | 48.6 | 54.6 | 63.6 | 47.6 | 47.6 | 47.6 | 47.6 | 47.6 |
| PP1 | 18 | 18 | 12 | | 16 | 16 | 16 | 16 | 16 |
| Carbon Black | 38 | 33 | 33 | 36 | 335 | 35 | 35 | 35 | 35 |
| Hubercarb CaCO3 | | | | | 1 | | | | |
| Mistron ZSC Talc | | | | | | 1 | | | |
| Cloisite NA+ | | | | | | | 1 | | |
| Cloisite 15A | | | | | | | | 1 | |
| Cloisite 20A | | | | | | | | | 1 |
| AO | 0.4 | 0.4 | 0.4 | 0.4 | 0.4 | 0.4 | 0.4 | 0.4 | 0.4 |
| Intermediate | 100 | 100 | 100 | 100 | 100 | 100 | 100 | 100 | 100 |
| Intermediate | 99.3 | 99.3 | 99.3 | 99.3 | 99.3 | 99.3 | 99.3 | 99.3 | 99.3 |
| Peroxide | 0.7 | 0.7 | 0.7 | 0.7 | 0.7 | 0.7 | 0.7 | 0.7 | 0.7 |

EVA 33% VA; 30 MI ethylene vinyl acetate copolymer
PP1 propylene ethylene copolymer (12% et); 25 MFR; peak melting point ~80 C.
Carbon Black Low-surface area, moderate structure furnace black
CaCO3 Hubercarb calcium carbonate
Talc Mistron ZSC talc
Cloisite Na+ natural montmorillonite with Cation exchange capacity of 93meg/100 g clay; d001 = 11.7 Angstroms
Cloisite 15A natural montmorillonite modified with 125meg/100 g clay using 2M2HT*; d001-31.5 Angstroms
Cloisite 20A natural montmorillonite modified with 95meg/100 g clay using 2M2HT*; d001 = 24.2 Angstroms *dimethyl-dihydrogentallow quaternary ammonium (chloride anion)
AO 4,4-bis(dimethyl benzyl)diphenylamine
Peroxide bis(t-butylperoxy)diisopropyl benzene
Insulations
HFDB-4202 TR-XLPE available from The Dow Chemical Company
HFDE-4201 XLPE available from The Dow Chemical Company

TABLE 2 (A)

| Dielectric Measurements on Insulation: Examples and Comparative Examples (part A) | | | | | | | | |
|---|---|---|---|---|---|---|---|---|
| Dielectric Measurements | | | | | | | | |
| | Comp. Example 1 | Comp. Example 2 | Comp. Example 3 | Comp. Example 4 | Comp. Example 5 | Comp. Example 6 | Comp. Example 7 | Comp. Example 8 |
| Semicon | none | SC-1 | SC-1 | SC-2 | SC-2 | SC-3 | SC-3 | none |
| Insulation | HFDE-4201 | HFDE-4201 | HFDE-4201 | HFDB-4202 | HFDB-4202 | HFDB-4202 | HFDB-4202 | HFDB-4202 |
| 140 C. aging | yes | no | yes | no | yes | no | yes | yes |
| Dielectric Constant 2 kV, 60 Hz | | | | | | | | |
| RT | 2.176 | 2.159 | 2.087 | 2.273 | 2.126 | 2.204 | 2.171 | 1.603 |
| 40 C. | 2.18 | 2.152 | 2.114 | #N/A | #N/A | #N/A | #N/A | #N/A |
| 50 C. | #N/A | #N/A | #N/A | 2.238 | 2.124 | 2.201 | 2.22 | 2.101 |
| 70 C. | #N/A | #N/A | #N/A | 2.22 | 2.119 | 2.162 | 2.191 | 2.164 |
| 90 C. | 2.068 | 1.809 | 2.042 | 2.038 | 2.08 | 2.048 | 2.046 | 2.067 |
| 110 C. | 1.859 | 1.733 | 1.875 | 1.876 | 1.857 | 1.894 | 1.891 | 1.943 |
| 130 C. | 1.813 | 1.711 | 1.786 | 1.808 | NOREADING | 1.854 | NOREADING | 1.907 |
| Dissipation Factor 60 Hz | | | | | | | | |
| RT | 0.000118 | 0.000125 | 0.000238 | 0.000311 | 0.001128 | 0.000358 | 0.000385 | 0.000595 |
| 40 C. | 0.000089 | 0.000108 | 0.000118 | #N/A | #N/A | #N/A | #N/A | #N/A |
| 50 C. | #N/A | #N/A | #N/A | 0.000152 | 0.000863 | 0.000238 | 0.000212 | 0.000358 |

TABLE 2 (A)-continued

Dielectric Measurements on Insulation: Examples and Comparative Examples (part A)
Dielectric Measurements

|  | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|
| 70 C. | #N/A | #N/A | #N/A | 0.000128 | 0.000709 | 0.000188 | 0.000502 | 0.000245 |
| 90 C. | 0.000125 | 0.000195 | 0.002882 | 0.000104 | 0.004656 | 0.000202 | 0.003408 | 0.000269 |
| 110 C. | 0.000714 | 0.000438 | 0.026552 | 0.000328 | 0.039538 | 0.000423 | 0.082562 | 0.000727 |
| 130 C. | 0.002512 | 0.001842 | 0.048558 | 0.001591 | NOREADING | 0.001378 | NOREADING | 0.002438 |

TABLE 2 (B)

Dielectric Measurements on Insulation: Examples and Comparative Examples (part B)

|  | Comp. Example 9 | Comp. Example 10 | Comp. Example 11 | Comp. Example 12 | Example 13 | Example 14 |
|---|---|---|---|---|---|---|
| Semicon | SC-4 | SC-5 | SC-6 | SC-7 | SC-8 | SC-9 |
| Insulation | HFDE-4201 | HFDE-4201 | HFDE-4201 | HFDE-4201 | HFDE-4201 | HFDE-4201 |
| 140 C. aging | yes | yes | yes | yes | yes | not measured |
| Dielectric Constant 2 kV, 60 Hz | | | | | | |
| RT | 2.107 | 2.037 | 2.16 | 2.116 | 2.113 | |
| 40 C. | 2.069 | 2.031 | 2.158 | 2.115 | 2.106 | |
| 50 C. | #N/A | #N/A | #N/A | #N/A | #N/A | |
| 70 C. | #N/A | #N/A | #N/A | #N/A | #N/A | |
| 90 C. | 1.949 | 1.068 | 1.987 | 2.063 | 1.969 | |
| 110 C. | 1.853 | 1.105 | 1.861 | NOREADING | 1.852 | |
| 130 C. | 1.801 | 1.164 | 1.336 | NOREADING | 1.787 | |
| Dissipation Factor 60 Hz | | | | | | |
| RT | 0.000142 | 0.000118 | 0.000168 | 0.000138 | 0.000121 | |
| 40 C. | 0.000118 | 0.000094 | 0.000112 | 0.000108 | 0.000092 | |
| 50 C. | #N/A | #N/A | #N/A | #N/A | #N/A | |
| 70 C. | #N/A | #N/A | #N/A | #N/A | #N/A | |
| 90 C. | 0.000074 | 0.002826 | 0.005512 | 0.003932 | 0.000452 | |
| 110 C. | 0.000345 | 0.025436 | 0.033355 | NOREADING | 0.003828 | |
| 130 C. | 0.001308 | 0.053439 | 0.062388 | NOREADING | 0.013652 | |

Examples 15-18

Semiconductive compositions were prepared as shown in Table 3.

TABLE 3

| Component | Example 15 SC-10 | Example 16 SC-11 | Example 17 SC-12 | Example 18 SC-13 |
|---|---|---|---|---|
| EVA | 47.6 | 45.6 | 47.6 | 45.6 |
| PP1 | 16 | 16 | 16 | 16 |
| Carbon Black | 35 | 35 | 35 | 35 |
| Cloisite 15A | 1 | 3 | | |
| Cloisite 20A | | | 1 | 3 |
| AO | 0.4 | 0.4 | 0.4 | 0.4 |
| Intermediate | 100 | 100 | 100 | 100 |
| Intermediate | 99.3 | 99.3 | 99.3 | 99.3 |
| Peroxide | 0.7 | 0.7 | 0.7 | 0.7 |

Dielectric Measurements for Examples 15-18 are shown in Table 4.

TABLE 4

|  | Example 15 | Example 16 | Example 17 | Example 18 |
|---|---|---|---|---|
| Semicon | SC-10 | SC-11 | SC-12 | SC-13 |
| Insulation | HFDE-4201 | HFDE-4201 | HFDE-4201 | HFDE-4201 |
| 140 C. aging | yes | yes | yes | yes |
| Dielectric Constant 2 kV, 60 Hz | | | | |
| RT | 2.027 | 2.146 | 1.897 | 2.131 |
| 40 C. | 2.055 | 2.157 | 1.996 | 2.153 |
| 50 C. | #N/A | #N/A | #N/A | #N/A |
| 70 C. | #N/A | #N/A | #N/A | #N/A |
| 90 C. | 0.818 | 1.695 | 1.992 | 1.985 |
| 110 C. | 1.061 | 1.871 | 1.882 | 1.894 |
| 130 C. | 1.081 | 1.805 | 1.833 | 1.833 |
| Dissipation Factor 60 Hz | | | | |
| RT | 0.000232 | 0.000163 | 0.000228 | 0.000168 |
| 40 C. | 0.000146 | 0.000112 | 0.000176 | 0.000117 |
| 50 C. | #N/A | #N/A | #N/A | #N/A |
| 70 C. | #N/A | #N/A | #N/A | #N/A |
| 90 C. | 0.000225 | 0.000388 | 0.000473 | 0.000228 |
| 110 C. | 0.001688 | 0.000904 | 0.002113 | 0.000586 |
| 130 C. | 0.004509 | 0.002151 | 0.006507 | 0.001236 |

As was discussed relative to Example 13, the use of organoclay in the semiconductive composition has dramatically reduced the resulting insulation dissipation factor after the insulation and semiconductive materials are thermally aged in intimate contact. This is again apparent with the same organoclay in Example 15. The dissipation factor values of Example 15 are lower than those experienced in Example 13, however, the very low dielectric constants reported for Example 15 may suggest that the bridge was not properly balanced for the higher test temperatures.

Nevertheless, as can be seen in Example 16, the dissipation factor reduction effect becomes more pronounced as the organoclay content in the semiconductor composition is increased. In Examples 17 and 18, an alternate organoclay is used in the compositions, again at 1% and 3% by weight. The effect with this organoclay is similar to that of Examples 15 and 16.

The results indicate that the use of approximately 3% of the organoclays can nearly eliminate the diffusion-related dissipation factor increase. The df increases noted in a 1% organoclay loading suggested a mere reduction in the rate of diffusion due to the presence of organoclay. At 3% a further reduction in diffusion is expected, however, reduction of the df values to that experienced by systems in which no elastomer was utilized suggest that either the timescale for diffusion at 140° C. is much longer than the 1-week aging time, or that there could be a physical bond which forms between the dissipative species and the organoclay.

The comparison of the effects of compositions prepared with organoclays with different levels of quaternary ammonium treatment indicate that the dissipation factor reduction is not directly related to the presence of excess treatment.

Comparative Example 19 and 22 and Examples 20, 21, 23-26

The effect of improved (reduced) cable dielectric losses through the addition of small amounts of organoclay in semiconductive shield compositions which also contain lossy elastomeric components has been demonstrated in the previous examples. Here the investigation is taken a step further to determine if the organoclay can provide similar effects within a lossy insulation layer (which would demonstrate a trapping of the lossy species, rather than a reduction in the migration of the species).

An ethylene-propylene-diene elastomer has been selected for this study. This polymer is compounded with several different layers of organoclay, and with the CLOISITE® grades of organoclay with different levels of quaternary ammonium treatment. The formulations are shown in Table 4. The results are presented in Tables 5 and 6, with graphical representation in the corresponding FIGS. 4 and 5.

The results indicate that the organoclay provides a means to dramatically reduce the dielectric losses of the EPDM resin at temperatures above 100° C. Some compromise of the dielectric losses at lower temperatures is experienced. However, the magnitude of the dielectric loss for addition of low levels of organoclay represents a significant improvement over the performance demonstrated for the EPDM without organoclay, for applications such as power cable insulation which experience use temperatures over the entire temperature range examined.

The benefit of the use of organoclay in the EPDM demonstrates that the effect in either insulating compositions or semiconductive compositions, is due to an interaction between the organoclay and the lossy species within the elastomer component, and is more than a reduction in migration of the lossy species.

TABLE 5

| Compositions in wt % | Comp. Ex. 19 | Example 20 | Example 21 |
|---|---|---|---|
| EPDM | 100 | 95 | 90 |
| Cloisite 20A | 0 | 5 | 10 |
| Intermediate | 98.1 | 98.1 | 98.1 |
| Dicup R | 1.9 | 1.9 | 1.9 |
| Sample Preparation | | | |
| Use Brabender to compound above compositions. | | | |
| Add all ingredients, achieve 90 C. melt temp. | | | |
| Continue to mix until uniformly distributed. | | | |
| (Begin with highest clay loading to determine mix time, then use same mixing conditions for all batches.) | | | |
| Add peroxide and mix for 1 additional minute. | | | |
| Press composition into workable form. | | | |
| Double-plaque each composition (do not exceed 100 C.) to remove voids | | | |
| Press into a 50 mil plaque and cure at 182 C. for 15 minutes. | | | |
| Remove Mylar and insert into 65 C. vacuum oven for 1 week. | | | |
| Perform DC/DF evaluations over a range of temperatures. | | | |
| Test Program | | | |
| DC at 2 kV, 60 Hz | | | |
| DC at RT | 2.189 | 2.358 | 2.594 |
| DC at 40 C. | 2.089 | 2.312 | 2.621 |
| DC at 90 C. | 1.946 | 2.183 | 2.571 |
| DC at 130 C. | 1.865 | 1.965 | 2.232 |
| DF at 2 kV, 60 Hz | | | |
| DF at RT | 0.000105 | 0.012898 | 0.032395 |
| DF at 40 C. | 0.000225 | 0.006178 | 0.023277 |
| DF at 90 C. | 0.004479 | 0.003158 | 0.015619 |
| DF at 130 C. | 0.020548 | 0.001802 | 0.007392 |

TABLE 6

| Compositions in wt % | Comp. Ex 22 | Example 23 | Example 24 | Example 25 | Example 26 |
|---|---|---|---|---|---|
| EPDM | 100 | 99 | 97 | 99 | 97 |
| Cloisite 15A | | 1 | 3 | | |
| Cloisite 20A | 0 | | | 1 | 3 |
| Intermediate | 98.1 | 98.1 | 98.1 | 98.1 | 98.1 |
| Dicup R | 1.9 | 1.9 | 1.9 | 1.9 | 1.9 |
| Test Program | | | | | |
| DC at 2 kV, 60 Hz | | | | | |
| DC at RT | 2.214 | 2.218 | 2.281 | 2.231 | 2.272 |
| DC at 40 C. | 2.063 | 2.097 | 2.231 | 2.111 | 2.212 |
| DC at 90 C. | 1.982 | 2.017 | 2.134 | 2.008 | 2.084 |
| DC at 130 C. | 1.883 | 1.911 | 2.048 | 1.911 | 1.977 |
| DF at 2 kV, 60 Hz | | | | | |
| DF at RT | 0.000068 | 0.002096 | 0.008807 | 0.001946 | 0.005795 |
| DF at 40 C. | 0.000149 | 0.001808 | 0.009076 | 0.003462 | 0.007012 |
| DF at 90 C. | 0.000922 | 0.001222 | 0.006345 | 0.000988 | 0.003967 |
| DF at 130 C. | 0.016897 | 0.001924 | 0.004259 | 0.001102 | 0.002238 |

Although the invention has been described in considerable detail by the preceding specification, this detail is for the purpose of illustration and is not to be construed as a limitation upon the following appended claims. All U.S. patents, allowed U.S. patent applications and U.S. Patent Application Publications are incorporated herein by reference.

We claim:

1. A layered structure comprising:
   a semiconducting layer comprising a first material that comprises a first polymeric resin and a conductive filler, wherein the first polymeric resin comprises at least one propylene copolymer which is a copolymer of propylene with an α-olefin comonomer, the propylene copolymer comprising lossy species; and
   an insulating layer consisting of a second material, the second material consisting of (a) a second polymeric resin consisting of a polyethylene crosslinked with dicumyl peroxide, and (b) an organoclay, wherein the organoclay is present and in an amount of up to 3 wt %, based on the total weight of the polymeric resin in the second material,
   wherein the semiconducting layer and the insulating layer are at least partially in physical contact with each other, and
   wherein the ratio of AC dielectric losses of a comparative structure to the layered structure is greater than 1.5, after aging at 140° C. for one week, when measured at a temperature of 130° C. and a frequency of 60 Hz, the comparative structure being identical to the layered structure except that the comparative structure lacks organoclay.

2. The layered structure of claim 1 wherein the first polymeric resin further comprises at least one ethylene homopolymer and/or ethylene copolymer.

3. The layered structure of claim 2 wherein the ethylene copolymer is a copolymer of ethylene with an α-olefin or with a vinyl acetate comonomer.

4. The layered structure of claim 1 wherein the conductive filler comprises at least one carbon black compound.

5. The layered structure of claim 1 wherein the organoclay is a natural montmorillonite modified with a quaternary ammonium compound.

6. The layered structure of claim 1 wherein the first polymeric resin is a thermoplastic resin.

7. The layered structure of claim 1 wherein the first material comprises:
   the first polymeric resin comprising the at least one propylene copolymer and an ethylene/vinyl acetate copolymer;
   the conductive filler comprising at least one carbon black compound;
   from 1 wt % to 3 wt % organoclay, based on the total weight of the polymeric resin in the first material; and
   bis(t-butylperoxy)diisopropyl benzene.

8. A cable comprising:
   (i) a core comprising one or more conductors; and
   (ii) a layered structure comprising
      a semiconducting layer comprising a first material that comprises a first polymeric resin and a conductive filler, wherein the first polymeric resin comprises at least one propylene copolymer which is a copolymer of propylene with an α-olefin comonomer, the propylene copolymer comprising lossy species; and
      an insulating layer consisting of a second material consisting of (a) a second polymeric resin consisting of a polyethylene crosslinked with dicumyl peroxide; and (b) an organoclay, wherein the organoclay is present and in an amount of up to 3 wt %, based on the total weight of the polymeric resin in the second material;
      wherein the semiconducting layer and the insulating layer are at least partially in physical contact with each other,
      wherein the ratio of AC dielectric losses of a comparative structure to the layered structure is greater than 1.5, after aging at 140° C. for one week, when measured at a temperature of 130° C. and a frequency of 60 Hz, the comparative structure being identical to the layered structure except that the comparative structure lacks organoclay; and
   wherein the semiconducting layer and the insulating layer directly or indirectly surround the core.

9. The cable of claim 8 wherein the first material comprises:
   the first polymeric resin comprising the at least one propylene copolymer and an ethylene/vinyl acetate copolymer;
   the conductive filler comprising at least one carbon black compound;
   from 1 wt % to 3 wt % organoclay, based on the total weight of the polymeric resin in the first material; and
   bis(t-butylperoxy)diisopropyl benzene.

10. The cable of claim 8, wherein the organoclay is a natural montmorillonite modified with a quaternary ammonium compound.

11. The cable of claim 8 wherein the first polymeric resin further comprises at least one ethylene homopolymer and/or ethylene copolymer.

12. The cable of claim 8 wherein the conductive filler comprises at least one carbon black compound.

13. The cable of claim 8 further comprising a plurality of neutral copper wires wrapped around the insulating layer, the plurality of neutral copper wires forming concentric helices.

* * * * *